A. H. MacISAAC AND T. CHAMPAGNE.
VALVE.
APPLICATION FILED JULY 9, 1920.

1,374,308.

Patented Apr. 12, 1921.

INVENTORS.
ALBERT H. MacISAAC.
THOMAS CHAMPAGNE.

UNITED STATES PATENT OFFICE.

ALBERT HAROLD MacISAAC AND THOMAS CHAMPAGNE, OF TORONTO, ONTARIO, CANADA.

VALVE.

1,374,308.   Specification of Letters Patent.   Patented Apr. 12, 1921.

Application filed July 9, 1920. Serial No. 395,151.

*To all whom it may concern:*

Be it known that we, ALBERT HAROLD MACISAAC and THOMAS CHAMPAGNE, both subjects of the King of Great Britain, residing at Toronto, in the county of York, in the Province of Ontario, Canada, have invented certain new and useful Improvements in Valves, of which the following is the specification.

Our invention relates to improvements in valves and the objects of the invention is to devise a simple, cheaply constructed valve which will dispense with all springs and washers liable to become out of order and which may be applied either to a pipe line or valve tap and it consists of the arrangement and construction of parts hereinafter more particularly explained.

In the drawings like characters of reference indicate corresponding parts in each figure.

Figure 1:
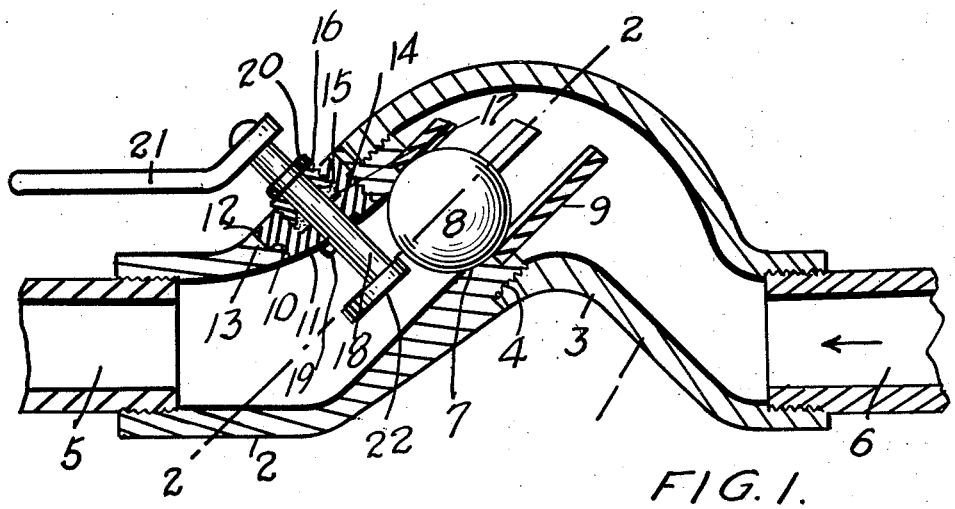
Figure 1 is a sectional view through our valve casing and valve seat thereof showing the ball valve and operating mechanism in full.
Figure 2:
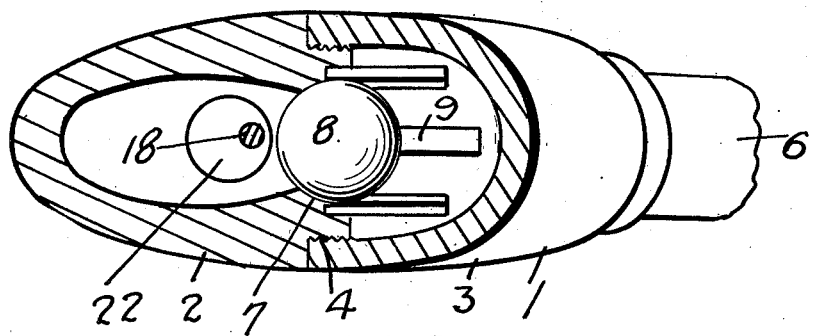
Fig. 2 is a plan sectional view on line 2—2 Fig. 1.

1 indicates the valve casing which is formed in two parts 2 and 3 connected together at 4 by a threaded or other suitable connection. The valve casing is connected at its ends to the opposing ends 5 and 6 of a pipe line and is in the form of a hump extending upwardly above the level of the pipe line formed by the pipes 5 and 6. 7 indicates the valve seat. 8 indicates a valve which is in the form of a ball and is retained in position by the fingers 9. 10 indicates an internally threaded orifice formed in the valve casing member 2. 11 indicates a plug which is screwed into such orifice and is provided at its upper end with an enlargement 12 fitting into an enlargement 13 of the orifice 10. 14 indicates an orifice extending centrally through the plug 11 and is provided at its outer end with an enlargement 15 in which is secured a packing gland 16 provided with packing 17. 18 indicates a shaft turnable within the orifice 14 and held from longitudinal movement therein by an enlargement 19 fitting against the inner face of the plug 11 and by a ring 20 which is secured to the shaft 18 against the outer face of the gland 16. 21 indicates the operating handle fo the shaft. 22 indicates an eccentric which is secured to the inner end of the shaft 18 substantially opposite the center of the ball 8.

The fluid pressure is in the direction of the arrow (see Fig. 1). When it is desired to open the valve, the handle 21 is turned carrying the eccentric 22 into engagement with the ball 8 which is gradually lifted off its seat thereby. When it is desired to close the valve the reverse operation takes place, the ball being forced onto the seat by the pressure of the fluid.

From this description it will be seen that we have devised a very simple form of valve operating mechanism which dispenses with all washers and springs and yet which at the same time is positive, and yet which may be operated to open with a minimum amount of exertion. Although we show our valve as applied to a pipe line, it will of course be understood that it might readily apply to a tap valve or to any other situation where a manually operated valve is required.

In a valve of this type it is very essential that the seat is supported so as to resist maximum pressures. In fluid valves such as steam valves a seat is formed in a bridge or web extending across the interior of the valve body, which bridge is often broken down in attempting to render the valve steam tight. In my valve it will be seen that the seat is formed in a solid body of metal, the pressure being exerted longitudinally of the inclined portion of the tubular casing, absolutely preventing any danger of the seat breaking down under any pressure, or of the valve blowing out.

What we claim as our invention is.

A valve casing, comprising a tubular body formed in two portions one of such portions having an upwardly inclined bent end terminating in an exteriorly threaded reduced portion and provided with an internal valve seat within such reduced portion, and the other valve body portion bent upward and then downward and provided at its extremity with an internally threaded portion engaging the aforesaid exteriorly threaded portion, a valve for the seat, and means operating beneath the valve for lifting the valve off its seat against fluid pressure.

ALBERT HAROLD MacISAAC.
THOMAS CHAMPAGNE.